United States Patent [19]

Seki et al.

[11] Patent Number: 5,410,696
[45] Date of Patent: Apr. 25, 1995

[54] METHOD OF PROCESSING A PROGRAM BY PARALLEL PROCESSING, AND A PROCESSING UNIT THEREOF

[75] Inventors: Mitsuho Seki, Ohaza; Mitsuji Ikeda, Katsuta; Yoshikazu Kiyoshige, Hitachi, all of Japan

[73] Assignee: Hitachi, Ltd., Tokyo, Japan

[21] Appl. No.: 32,066

[22] Filed: Mar. 16, 1993

[30] Foreign Application Priority Data

Mar. 16, 1992 [JP] Japan .................................. 4-058412

[51] Int. Cl.$^6$ .............................................. G06F 9/38
[52] U.S. Cl. ............................. 395/650; 364/DIG. 1; 364/281.4; 364/281.6; 364/231.6
[58] Field of Search .................. 364/DIG. 1 MS File; 395/650

[56] References Cited

U.S. PATENT DOCUMENTS

| 4,734,848 | 3/1988 | Yamano et al. | 395/650 |
| 4,819,151 | 4/1989 | May | 395/650 |
| 5,072,371 | 12/1991 | Benner et al. | 364/DIG. 1 |
| 5,127,104 | 6/1992 | Dennis | 395/650 |

FOREIGN PATENT DOCUMENTS

| 63-76017 | of 1988 | Japan . |
| 2-178755 | of 1990 | Japan . |
| 2-280266 | of 1990 | Japan . |
| 3-41523 | of 1991 | Japan . |
| 3-103964 | of 1991 | Japan . |

Primary Examiner—Thomas M. Heckler
Attorney, Agent, or Firm—Antonelli, Terry, Stout & Kraus

[57] ABSTRACT

In order to process a program by parallel processing using a plurality of processors, the program is divided into a plurality of partial programs. Then one or more expressions are derived, the or each expression expressing a relationship between the partial programs, such as which can be executed independently and which require the execution of another partial program. The expression or expressions can then be investigated to determine which has a desired characteristic, such as a characteristic corresponding to uniform loading of the processors. The expression can also be varied, to give more options for the selection of the expression with the desired characteristic. Then the partial programs can be distributed to the processors on the basis of the relationship corresponding to the expression which has the desired characteristic. Furthermore, when the partial programs are being executed by the processors, any processor which has completed its processing broadcasts a signal to the other processors, which may then re-assign one or more of their partial programs. In this way, parallel processing can be carried out quickly, with substantially uniform loading of the processors.

18 Claims, 17 Drawing Sheets

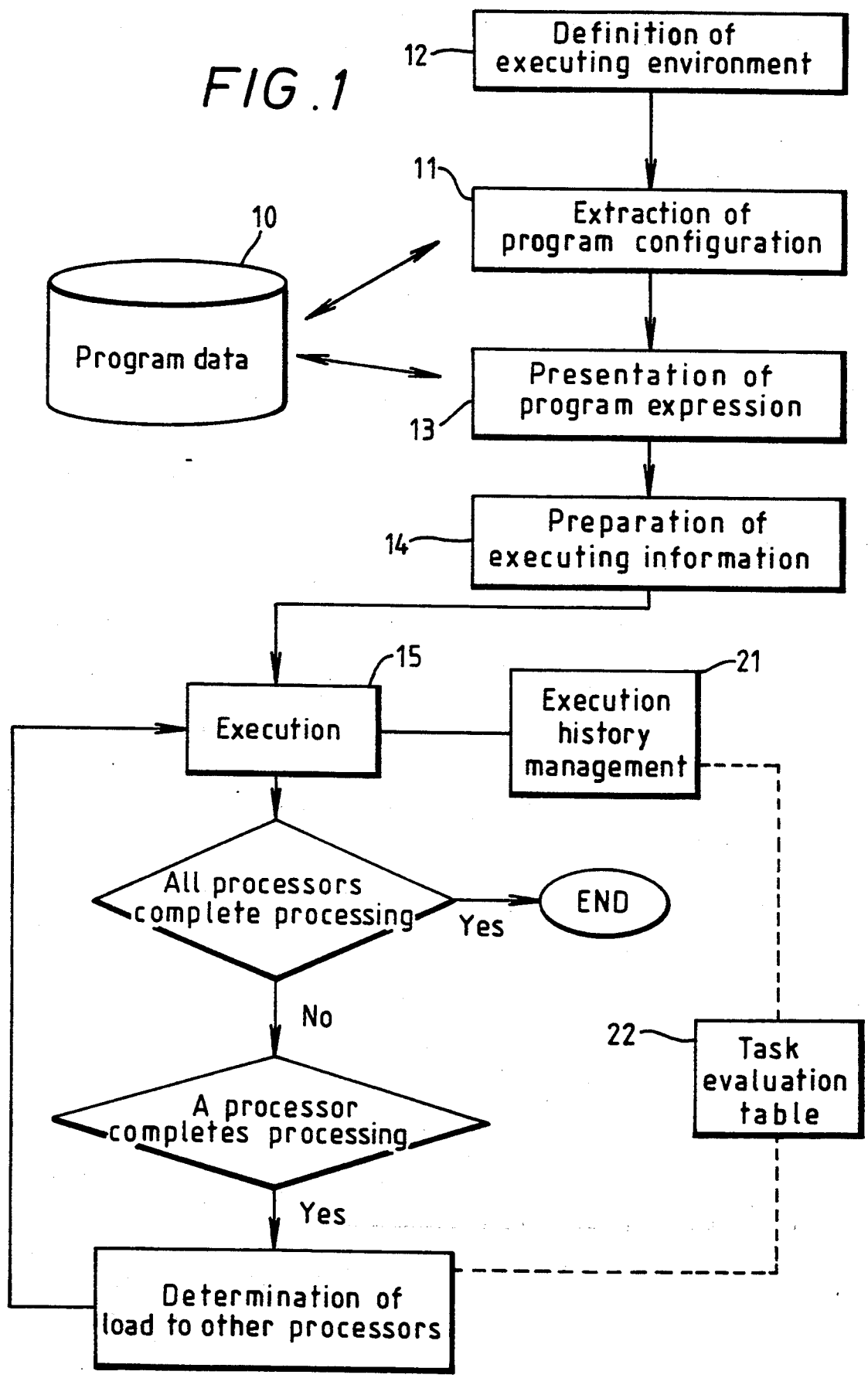

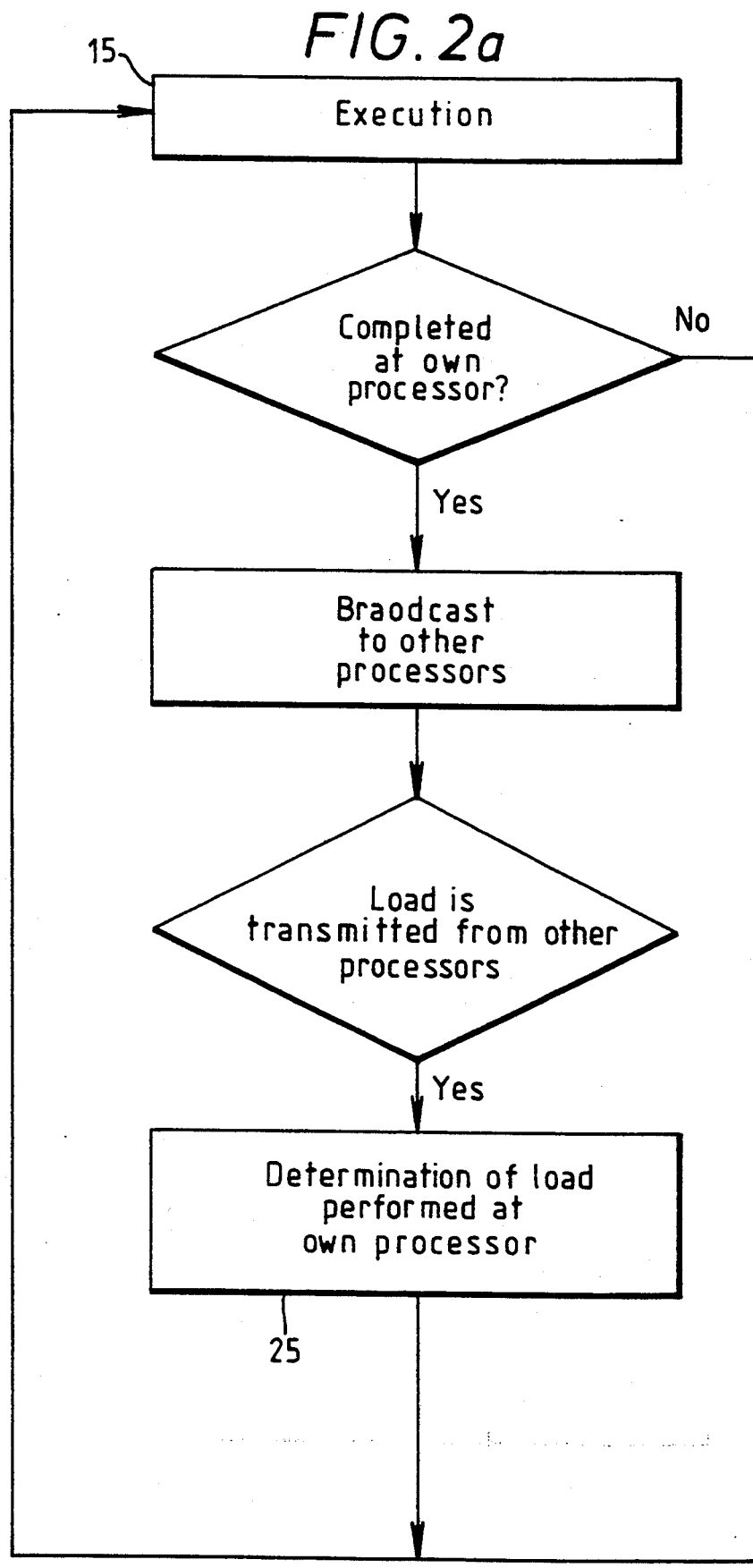

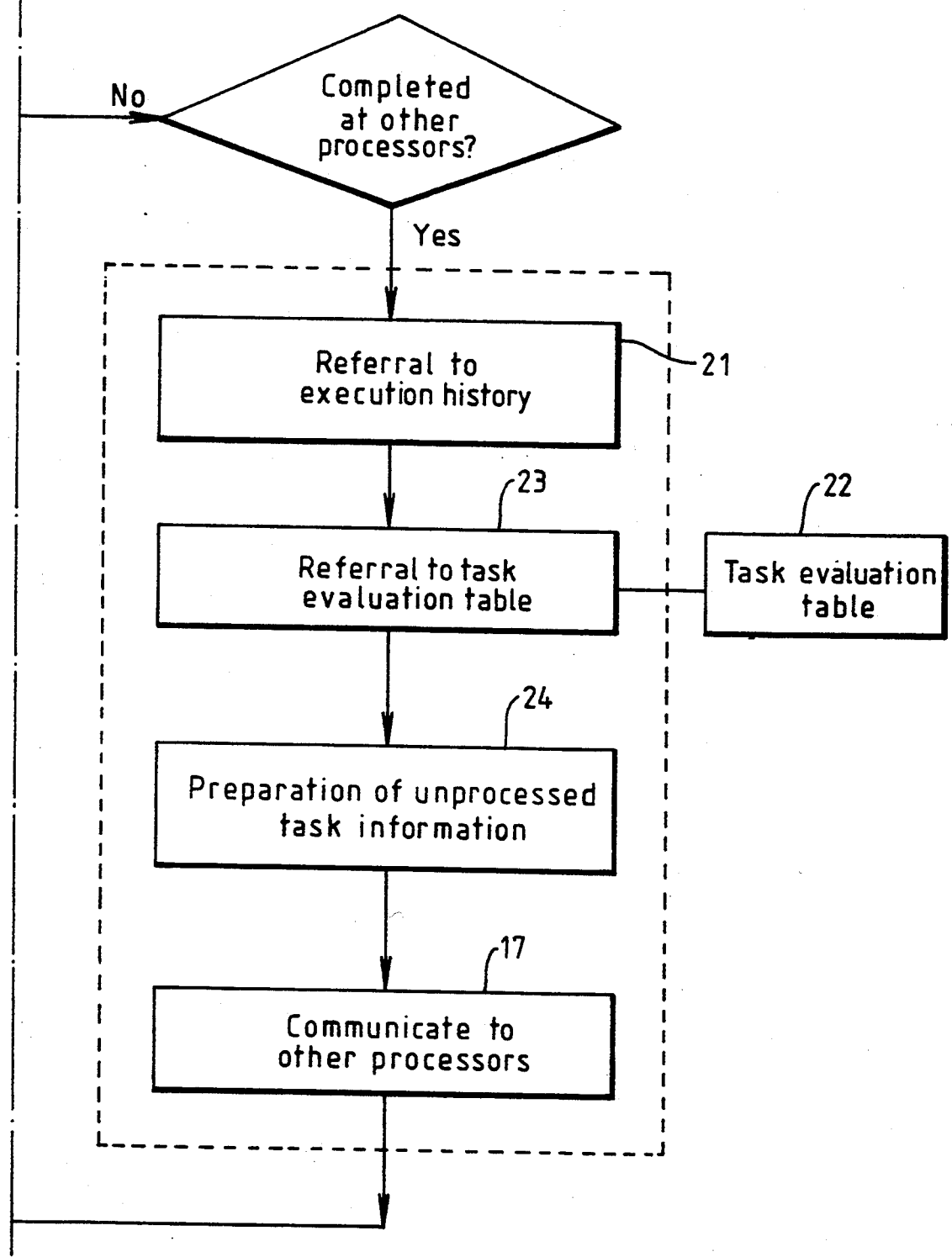

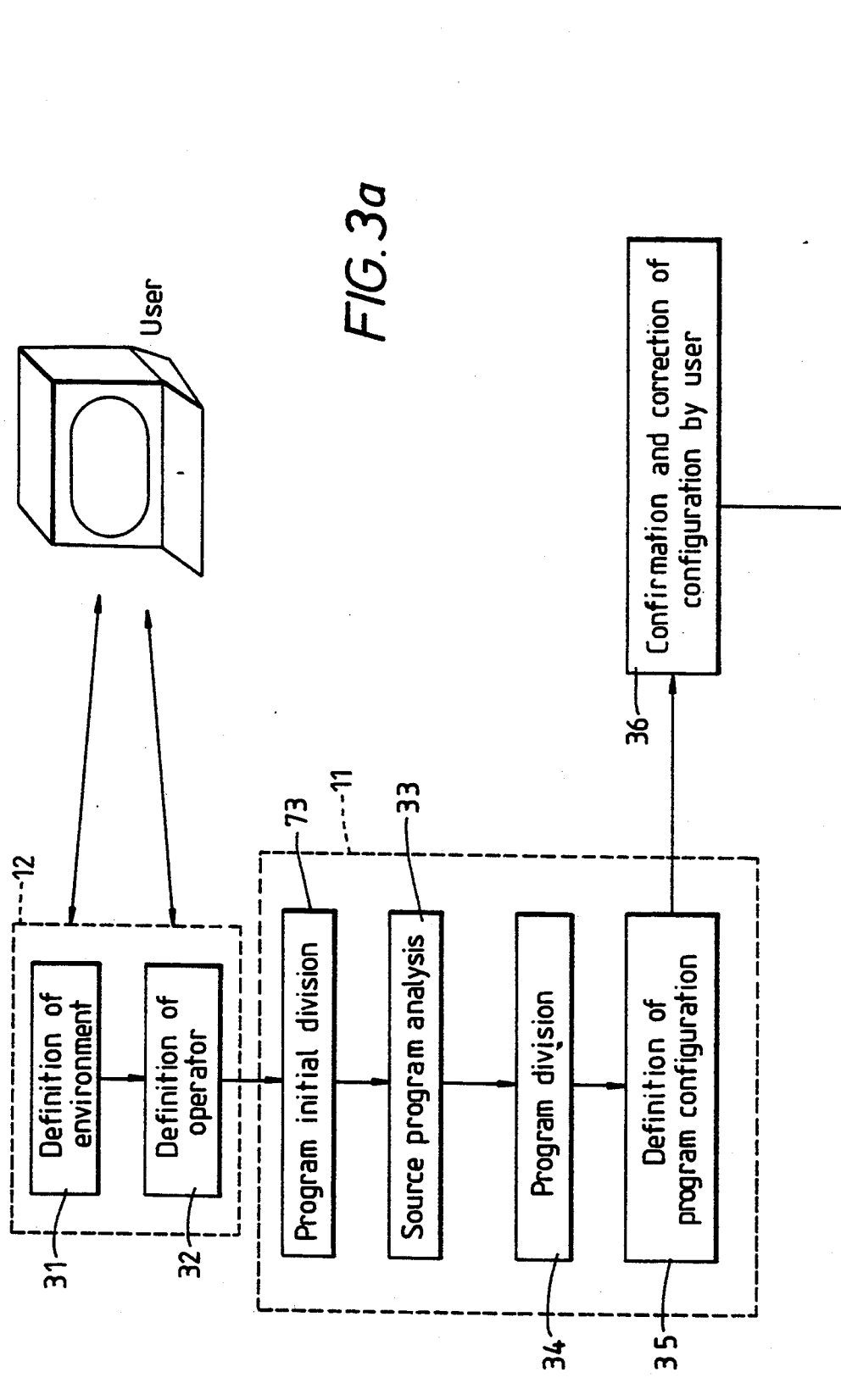

Example of processing (2) Display according to comment

FIG. 7(a)

Example of processing

Structure of processing A

Structure of processing B

○ Numerical figures by the circles correspond to processing volume $A = A1 + A2$ $B = B1 + B2$
$= B11 + B12 + B21 + B22$

Example of load diffusion

1 processor   $A * B = 15$ 2 processors  $A * B = (A1 + A2) * (B1 + B2)$
              $= A1 * B1 + A2 * B2$     (i)
                 (7)

3 processors  $A * B = (A1 + A2) * (B1 + B2)$
              $= A1 * B1 + A2 * B2$     (ii)
              $= A1 * B1 + A2 * (B21 + B22)$
              $= A1 * B1 + A2 * B21 + A2 * B22$     (iii)
                 (7)       (6)

4 processors  $A * B = (A1 + A2) * (B1 + B2)$
              $= A1 * B1 + A2 * B2$
              $= A1 * (B11 + B12) + A2 * (B21 + B22)$
              $= A1 * B11 + A1 * B12 + A2 * B21 + A2 * B22$     (iv)
                 (6)     (6)     (6)     (6)

Relation of dependency for processing

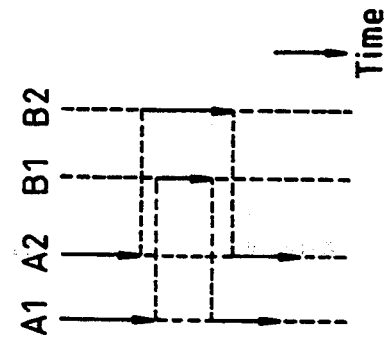

Time

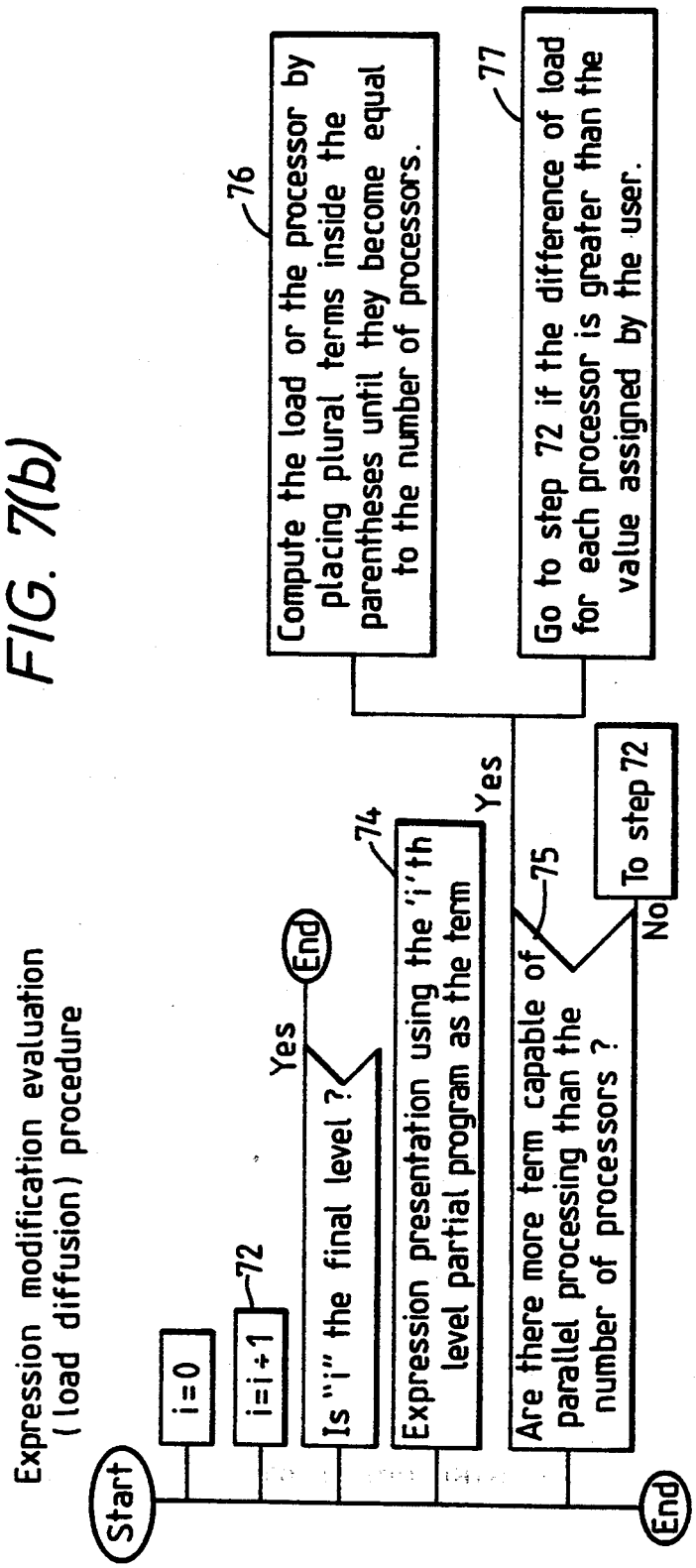

FIG.8(a)
Example of processing

Determine the position of each processor when there are seven tasks from A to G and each of them are allotted to a processor
Expression presentation of the program as seen from the communication volume is:

$A*B + A*CD + A*E + A*FG + C*F + C*G + B*D$ (a)

The above expression is modified as:

$A*(B+CD+E+FG) + C*(F\ G) + BD$ (b)
$A*(B+CD+FG) + C*(F+G) + A*E + BD$ (c)

Maximum communication volume CD, FG, BD
Medium communication volume $A*B$, $A*CD$, $A*E$, $A*FG$, $C*F$, $C*G$ Others have small communication volume
Definition of symbols
$A+B$: Small communication volume
$A*B$: Medium communication volume
$AB$: Large communication volume

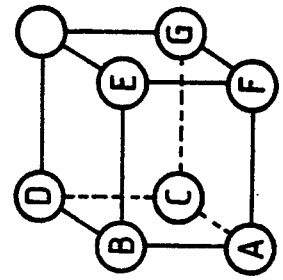

FIG.8(c)
Hyper cube-type coupled computer

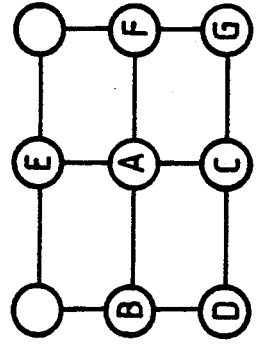

FIG.8(b)
Mesh-type coupled computer

Processing volume of each processor and status at time "t"

Load diffision procedure

METHOD OF PROCESSING A PROGRAM BY PARALLEL PROCESSING, AND A PROCESSING UNIT THEREOF

BACKGROUND OF THE INVENTION

1. Field of the Invention

The present invention relates to a method of processing a program by parallel processing, using a plurality of processors. It also relates to a processing unit for carrying out such a process.

2. Summary of the Prior Art

In order to process a program by parallel processing, the program is divided into a plurality of partial programs, which are then distributed among a plurality of processors of a processing unit for processing. Each processor processes one or more of the partial programs. The speed of the processing of the program is then determined by the speed of processing of the partial programs assigned to each processor, with the processor which takes longest to process its assigned partial programs being the one which has the maximum influence on the overall processing time. Thus, if the parallel processing unit is to operate efficiently, it is important that the partial programs are distributed so that each processor will take approximately the same time as all other processors to process the partial programs assigned to it. It is therefore necessary to determine an efficient distribution of the partial programs, a process which is known as "load diffusion".

There are two types of load diffusion, namely static load diffusion and dynamic load diffusion. In static load diffusion, the assignment of the partial programs to the processors is predetermined prior to the processing of those partial programs by the processors. In dynamic load diffusion, the distribution of the partial programs is changed whilst the processors are processing the partial programs.

JP-A-3-41523 proposed a method of static load diffusion, in which a multi-step network switch was provided. This switch was a hardware component which was configured in advance of processing, to assign the partial programs to the processors.

JP-A-2-280266 was concerned with dynamic load diffusion in which each processor determined whether it had a high level of processing to be carried out. When that high level was detected, it generated a signal requesting that processing of partial programs be transferred to other processing units.

In JP-A-3-103964, a processor which had completed the processing of the partial programs assigned to it was arranged to receive partial programs from an adjacent processor which had not completed the processing of its assigned partial programs. Thus, JP-A-3-103964 was also concerned with dynamic load diffusion.

Similar monitoring of adjacent processors occurred in JP-A-63-76017.

Finally, JP-A-2-178755 proposed that thresholds effect for each processor, being an upper threshold and a lower threshold. Then, if the amount of the processing needed by one processor exceeded the upper threshold, then further assignment of partial programs to that processor was halted. Similarly, if the amount of processing for a processor was less than the lower threshold, that processor was ready to receive further partial programs.

SUMMARY OF THE PRESENT INVENTION

The majority of known load diffusion proposals discussed above were concerned with dynamic load diffusion. If processing of the program relies only on dynamic load diffusion, then a large proportion of the total processing time may be taken up by the transfer of partial programs between processors, rather than the processing of those partial programs themselves. Therefore, there is advantage in predetermining the distribution of the partial programs among the processors, i.e. carrying out static load diffusion, so that transfer of partial programs between processors can be eliminated, or at least reduced to a minimum.

However, the static load diffusion arrangement proposed in JP-A-3-41523 involved hardware, and was thus expensive and relatively inflexible. Once the hardware switches had been set for a particular program, it was difficult or impossible to change them. Therefore, the present invention seeks to provide a method of processing a program which permits static load diffusion which is not limited by hardware. However, it should also be noted that the present invention is applicable to dynamic load diffusion.

At its most general sense, the present invention proposes that a plurality of expressions are determined for the partial programs, and those expressions are investigated to select one of them which has a predetermined characteristic. Then, the selected expression determines the arrangement of partial programs to the processors.

Thus, the derivation of the expression or expressions corresponding to the partial programs of a program is a fundamental feature of the present invention. Different aspects of the present invention are concerned with the derivation of that expression or expressions.

When a program is divided into partial programs, it is then possible to determine relationships among those partial programs. For example, the action of one partial program may be dependent on the action of another partial program. Then, when processing the partial programs, consideration must be given to that relationship. Of course, although a partial program will have a relationship with every other partial program, some of those relationships may be null, in that processing of the two partial programs can be carried out wholly independently.

Therefore, for a given division of the program into a plurality of partial programs, a plurality of relationships can be determined. It is then possible, using that plurality of relationships, to determine an expression corresponding to the partial programs. That expression seeks to specify a characteristic of the relationships. Thus, for example, the expression may express the duration of processing needed for the partial programs, on the basis of their relationships, so that the expression then assists in determining the assignment of the partial programs to the processors.

In a first aspect, the program is broken down into sets of partial programs, so that each set may then correspond to a different breaking down of the program into partial programs. Then, if the expression is determined for each set, it is possible to compare the expressions to determine which is optimum. For example, if the expression relates to the processing time for a given assignment of the partial programs to the processors, then comparison of the expressions permits the set to be chosen which results in the most uniform distribution of processing (in terms of processing time), so that the optimum division of the program into partial programs, and assignment to the processors, can be determined.

It should be noted that it may be possible to derive more than one relationship between pairs of partial programs, for example because the relationship depends on one or more others of the partial program. And, different combinations of the relationships can be determined, with each combination resulting in a different expression. Then, the expressions can be compared to determine an appropriate assignment of the partial programs to the processors. This is thus a second aspect of the present invention.

The above discussion has concentrated on static load processing, in that it was assumed that the division of the program into partial programs, or sets of partial programs, occurred before the partial programs were assigned. This is not necessary, and the invention may be applied to dynamic processing, with the assignment of the programs then corresponding to a transfer of one or more of the partial programs from one processor to another, which transfer is determined by the comparison of the expressions. Furthermore, in a third aspect of the present invention, there is iteration of the steps of dividing the program into partial programs, to obtain a set of partial programs (as in the first aspect) or the determination of the relationships (as in the second aspect). Then, at each iteration, the expressions can be compared with a desired characteristic. Thus, whilst the first and second aspects of the present invention were primarily concerned with determining the optimum division of the partial programs and assignment to the processors on the basis of an optimum expression, iteration arrangements may be satisfactory when it is desired to keep at least a predetermined level which need not be optimum. Thus, although it may be possible to use the present invention to consider all possible divisions of the program into partial programs, to determine the optimum division, it may be sufficient to repeat the re-divide of the partial programs until a division is found which, when the partial programs are then assigned to the processors, achieves sufficiently uniform processing time.

As a final checking step, the selected division of the partial programs may be displayed so that a user can check the divisions. In a further development, such a user may be able to modify the division.

Finally, in another aspect of the present invention, the present invention proposes that a processor which has completed the processing of partial programs assigned thereto broadcasts a completion signal which is detected by all other processors. Then, any processor which still has partial programs to process may transfer the partial program to the processor which has just broadcast its completion signal.

It may further be noted that the present invention relates to a method of processing of programs by parallel processing in accordance with the above aspects, and the processing unit for carrying out such a method.

With the present invention, a static or dynamic load diffusion method is provided which poses no limit on the dividing of the program into partial programs, and permitting a wide variety of relations of the divided programs. The present invention can be achieved without a specific hardware structure, thereby simplifying operation thereof and making operation less expensive.

BRIEF DESCRIPTION OF THE DRAWINGS

FIG. 1 is a flowchart showing basic processing steps in an embodiment of the present invention;

FIGS. 2a and 2b represent combinable portions of a flowchart showing an example of a dynamic load diffusion processing in the embodiment of FIG. 1;

FIGS. 3a and 3b represent combinable portions of a flowchart showing an example of a static load diffusion processing and inter-processor architecture determination processing in the embodiment of FIG. 1;

FIGS. 7(a) and 7(b) are diagrams respectively illustrating an expression modification processing procedure;

FIGS. 8(a) to 8(c) respectively show an example of inter-processor architecture determination expression modification processing procedure, and two examples of inter-processor architectures which can be used in an embodiment of the present invention;

DETAILED DESCRIPTION

Figure 3B:
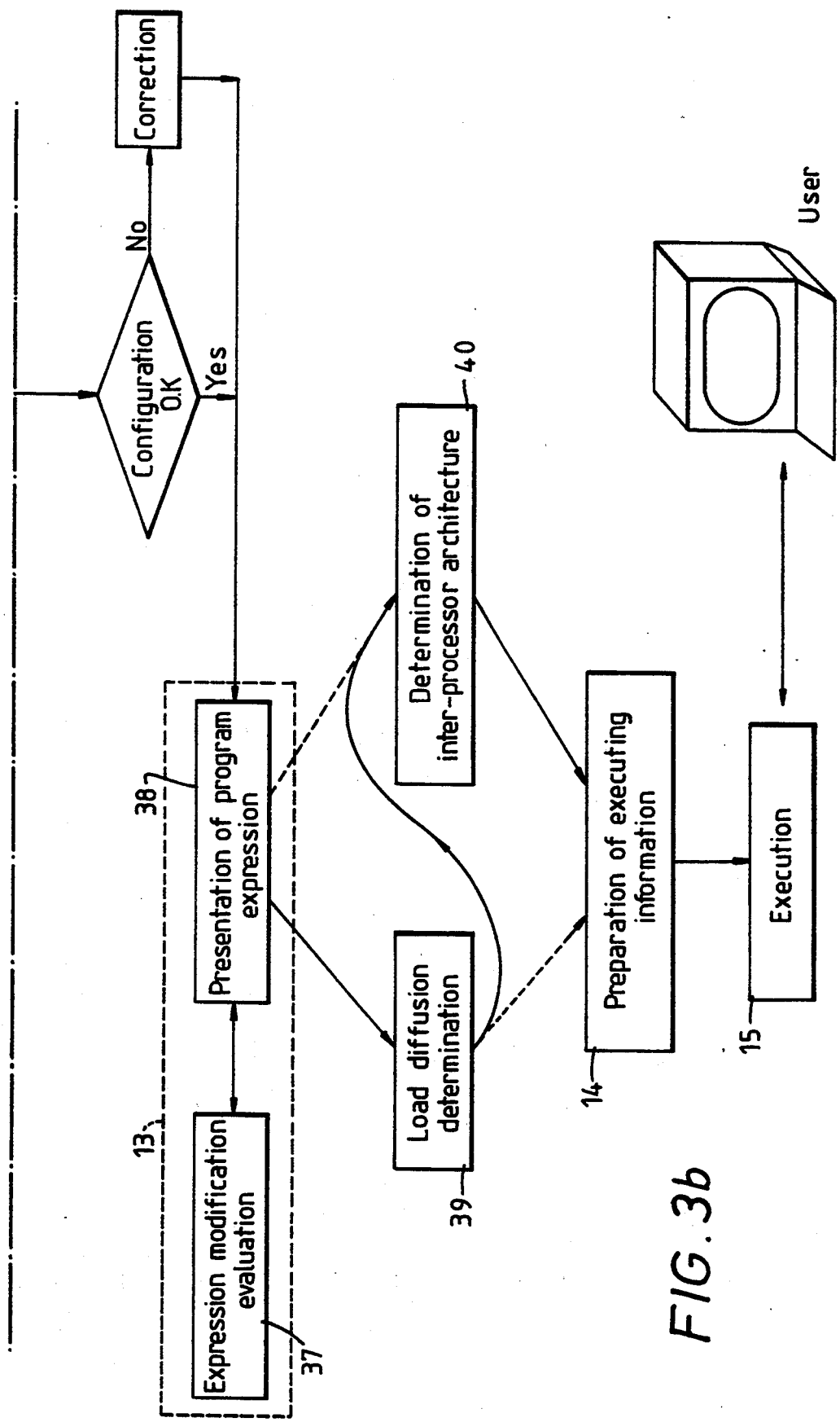

Embodiments of the present invention will now be described in detail. The description thereof will concentrate on the functions (operations) carried out by the embodiments. The functions described may be carried out in separate physical components, and some functions may be carried out in a common physical component.

First, the sequence of operations which is carried out by a parallel computation processing unit according to the present invention will be discussed with reference to FIG. 1. This sequence illustrates static load diffusion and allotment of tasks to processors which are determined prior to execution of the program and processing for dynamic load diffusion which is performed after the start of program execution.

The operation carried out prior to execution of the program include a definition of executing environment operation 12, an extraction of program configuration operation 11, a presentation of program expression operation 13 and a preparation of executing information operation 14. Reference may be made to a program and data file 10 for the extraction of program configuration operation 11 and the presentation of program expression operation 13.

The definition of executing environment operation 12 defines the number of processors when executing a parallel program, the capability of each processor and the hardware-related configuration of a parallel computer system. These may be set by a user or as a default value. In addition, it defines the information corresponding to the basis on which the program is to be analyzed, e.g. load equalization of each processor (i.e equal division of processing tasks) and minimization of the volume of communication between the processors.

The extraction of program configuration operation 11 analyzes a source program by using a parallel structure on a program language level which is described in the source program and by relying on the relationships at a resistor level for storing variables. In doing so, reference is made to information from the definition of executing environment operation 12. Then, the extraction of program configuration operation 11 defines partial programs from the results of source program analysis and performs a three-layer partial program presentation by combining partial programs that may be considered a "parent" of partial programs with partial programs that may be considered a "child". Partial programs considered as a "child" are those resulting from sub-division of other partial programs, which latter are "parents". Then it defines the configuration of the entire program in dependence on the results of the program division. This extraction of program configuration operation 11 extracts the program configuration which is most suitable for parallel processing.

The presentation of program expression operation 13 then determines a program configuration, which has a definition of program configuration 35 (described in detail in FIGS. 3a and 3b). At the same time, it performs an evaluation of indices given by the definition of executing environment operation 12 (number of processor units and their capability, purpose of load diffusion such as load equalization and minimization of communication volume, etc.) and then performs an expression modification. This presentation of program expression operation 13 presents a program as an expression and can modify it at will. As it is capable of modifying the expression at will, it is capable of modifying the expression according to the capability of each computer and divide the partial programs to task groups when a parallel processing system has processors with different capability.

The preparation of executing information operation 14 resolves the expression that was finally determined in the presentation of program expression operation 13 into the number of processors that are used in the execution and allocates the partial programs to the corresponding processors as task groups. In addition, it computes the communication volume for the tasks and determines which task group is to be allotted to which processor. The hardware configuration is taken into consideration at this time. Lastly, it determines the address of programs and data that are loaded into each processor.

These four operations 11, 12, 13 and 14 provide static load diffusion and partial program allotment to each processor. Since it is possible to modify the defined expression at will and resolve terms from a partial program configuration by presenting the source program as an expression with those partial programs as terms, there is no limit to the number of partial programs and the number of combinations thereof. As a result, the optimum load diffusion and task allotment to the processors can be determined.

After the program execution has started, an execution operation 15, an execution history management operation 21 and a load determination operation 17 on other processors may occur. When one processor completes its processing, but not all processors have completed their processing, a load determination operation 17 (processing) determines the loads to be allotted to other processors by referring to a task evaluation table 22.

Figure 13A:
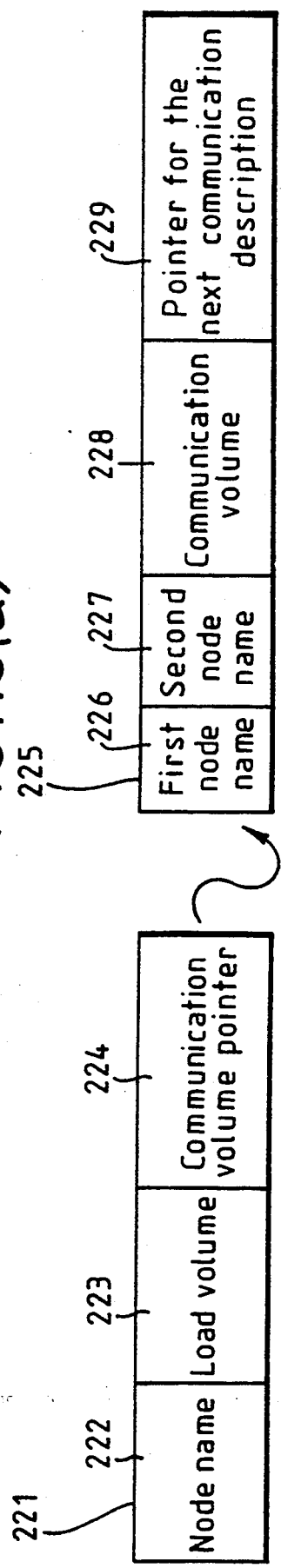
FIG. 13 is a diagram for explaining a task evaluation table.
Figure 13B:
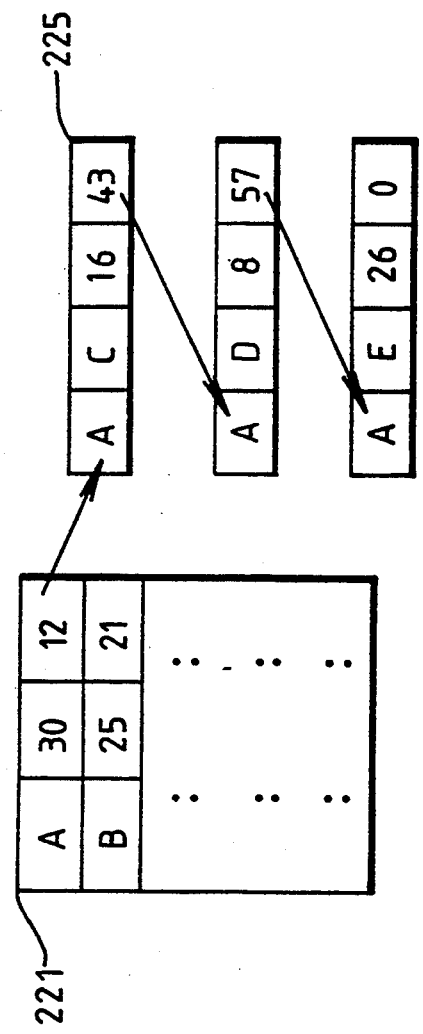

The configuration of the task evaluation table 22 is illustrated in FIGS. 13(a) and 13(b). As shown in FIG. 13(a), the task evaluation table 22 has a load volume table 221 and a communication volume table 225. The load volume table 221 has respective fields which include a node name 222, a load volume 223 and a communication volume pointer 224. The node name 222 represents the task name and the load volume shows the processing volume of this task. The processing volume of a task may be determined, for example, by the length of its partial program and parameters that are given explicitly from an external source.

The communication volume pointer 224 is a pointer that identifies the position of the communication volume table 225 (communication description) which describes the communication volume between a node name 222 and the node to which it corresponds. The communication volume table 225 identified by the load volume table 221 has a first node name 226, a second node name 227, a communication volume 228 and a pointer 229 which points out the next communication description. The first node name 226 is a node name which corresponds to the node name 222 of the load volume table 221. The second node name 227 is the node name of that which communicates with the first node name 226.

The communication volume 228 shows the communication volume between the two nodes. This communication volume can also be determined, for example, by parameters that are given explicitly from an external source.

The next communication description pointer 224, as shown in FIG. 13(b), identifies the communication description when a node name 221 performs communication with yet another node. If there is no node to communicate with, "0" is stored in the pointer 229. In the example in FIGS. 13(a) and 13(b), node A has a load volume of "30" and can take communication volumes of "16," "8," and "26" between node C, node D and node E, respectively.

Operationally, state load diffusion occurs before dynamic load diffusion. However, dynamic load diffusion will be explained first, with reference to the flow-chart of FIGS. 2a and 2b. Information such as processor operation status during execution of parallel processing, communication volume between processors and execution time are determined in an execution history management step 21. During the execution 15 of basics by a processor, a message of processing completion is received from other processors if processing is not completed at the receiving processor but is completed at other processors. Then, the receiving processor actuators to an execution history management step 21 and determines the program and data which it is currently executing. Reference is made at step 23 to task evaluation table 22, which has been obtained by static load diffusion, and which maintains the load volume and communication volume of partial programs that are assigned to the receiving processor. An unprocessed task information preparation step 24 determines the partial program or data that can be allotted to other processors from this information and transmits information to other processors.

When the receiving processor completes the tasks assigned thereto it transmits a completion message to other processors. Then it determines which of the loads that have been received is the largest, in a determination of load step 25 performed in the receiving processor when a load (information showing load volume) is transmitted from other processors. The load may then be transferred and the processor then processes it as a new load.

Next, the operations leading up to the execution step 15 in FIG. 1 will be described with reference to FIGS. 3a and 3b.

The definition of executing environment operation 12 can be divided into a definition of environment step 31 and a definition of operator step 32. The definition of environment step 31 defines the number of processors at the time of execution of a parallel program, the capacity of each processor and the hardware configuration of the parallel computing system. There may be a set by a user or as a default value. The definition of operator step 32 defines the operator when presenting a program as an expression. For instance, as shown in the example of processing illustrated in FIG. 7(a), these operators may be "+" when both partial programs can be executed independently, and "." when a partial program must be one executed after another partial program. These operators are satisfactory if the objective is load equalization among the processor. Other operators may include no mark corresponding to a large communication volume, "*" corresponding to a medium communication volume and "+" corresponding to small communication volume are defined if the objective is minimization of the volume of communication between the processors.

Figure 4A:
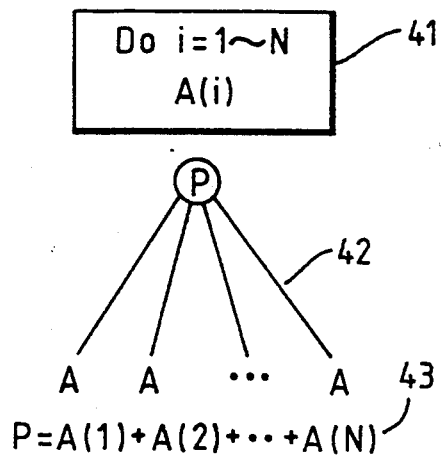
FIGS. 4(a) to 4(d) are diagrams for explaining source program analysis and an example of program configuration presentation in the embodiment of FIG. 1.
Figure 4B:
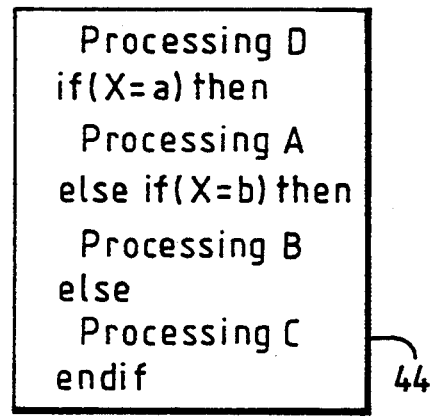
Figure 4C:
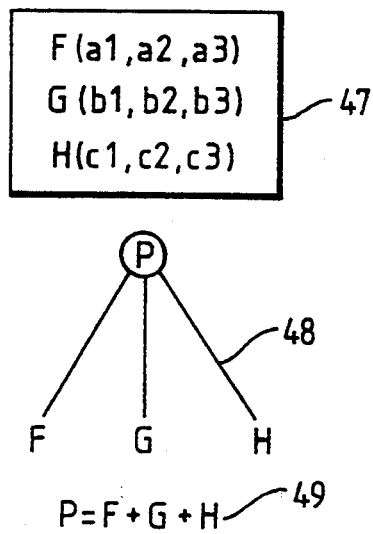
Figure 4D:
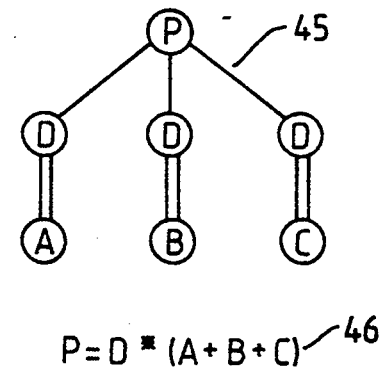

The extraction of program configuration 11 operation has a source program initial division step 73, a source program analysis step 33, a program division step 34 and a definition of program configuration step 35. The source program initial division step 73 divides a source program according to statement number or on a subroutine basis and transmits the source program to each processor so that each processor can analyze the source program. As shown in FIG. 4, the source program analysis step 33 uses a parallel configuration (e.g. a Do statement presentation 41 as illustrated in FIG. 4(a)) on a program language level which is described in a source program and, if there is an if statement 44 (as illustrated in FIG. 4(b)), the source program analysis step 33 distributes the processing before the if statement to each processing in the if statement. In addition, it performs an analysis of a source program based on the relationship 47 on a resistor level for storing the variables (as illustrated in FIG. 4(c). The program division step 34 defines a partial program according to the results of the source analysis. The definition of program configuration step 35 carries out, a three-layer partial program presentation by combining a partial program which is a "parent" and a partial program which is a "child" of the partial program (see FIG. 5). This then presents the entire program as an expression. This expression is used it at the time of modifying and resolving the expression. The configuration of the entire program is then defined. FIG. 4(d) illustrates a graphical of a presentation of a partial program configuration 45 and the corresponding partial program source description 46.

Figure 6A:
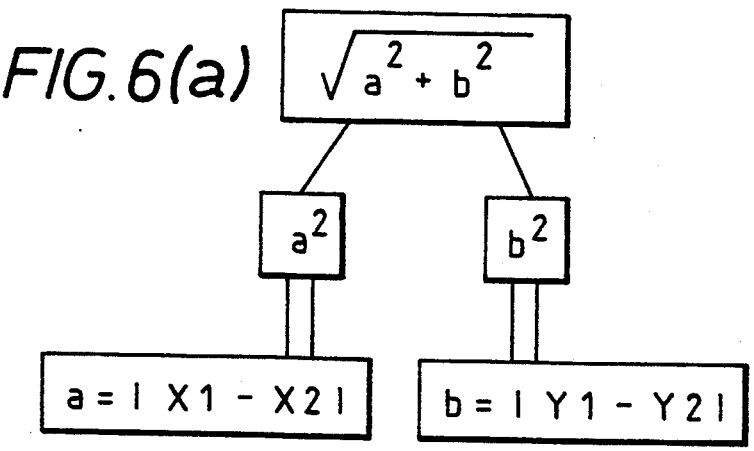
FIGS. 6(a) and 6(b) and 6(c) are diagrams for explaining an example of display for confirmation of the configuration.
Figure 6B:
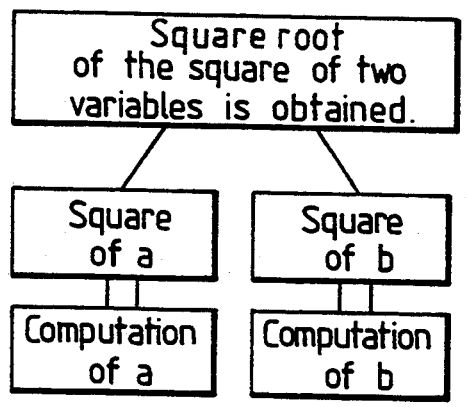
Figure 6C:
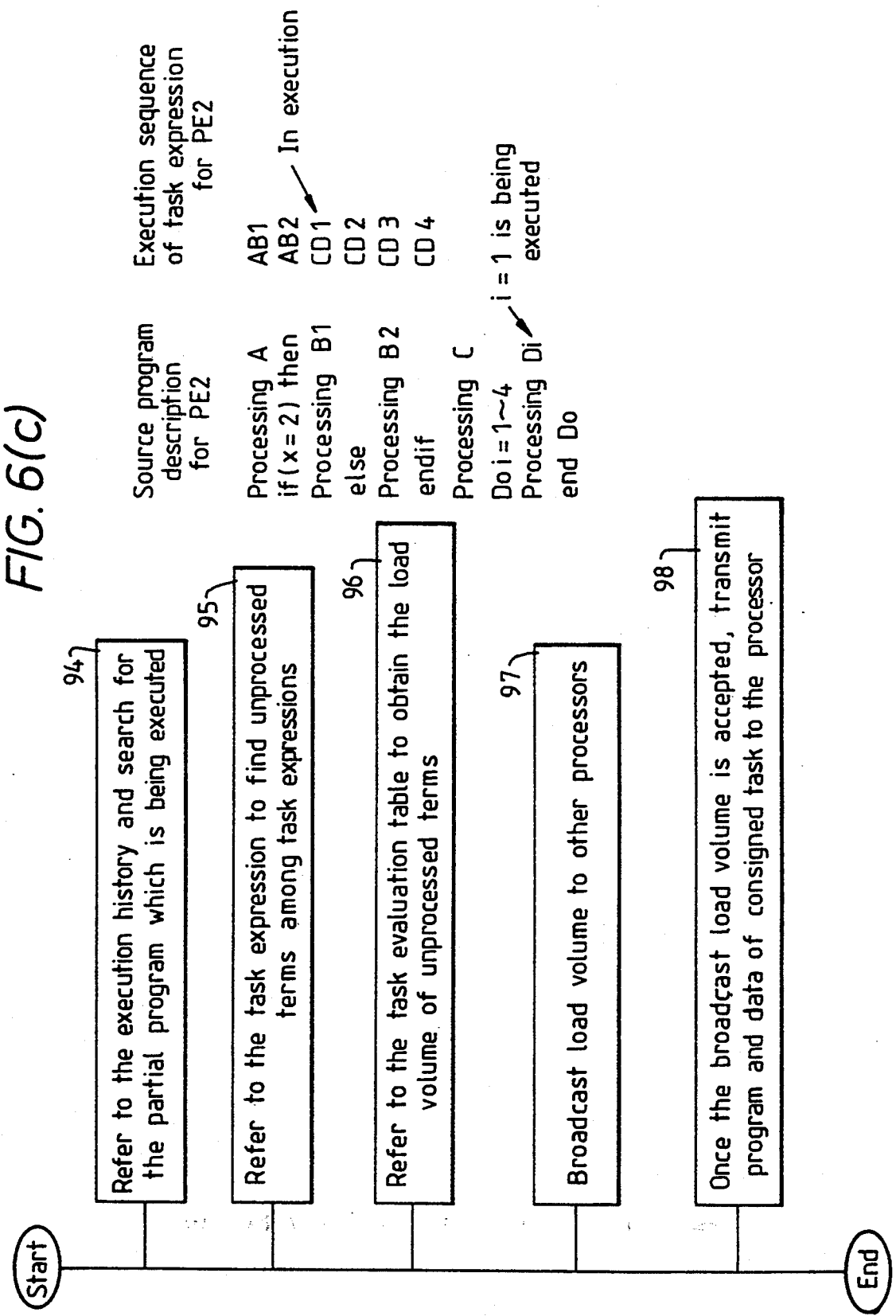

After the definition of the expression is completed, the results are sent to a confirmation and correction step 36 for further configuration by the user or for confirmation by the user. Although this confirmation and correction step 36 is not a mandatory step it permits the proposed parallel processing to be considered by the user by displaying the program configuration for the user and giving the user a chance for confirmation and correction of the configuration. At the same time, it can be used effectively as a complementary operation for debugging. An actual example of a program is shown in FIGS. 6(a) and 6(b). In the method of display of the example of processing shown in FIG. 6(a), a user uses the comments described inside the source program to derive the display shown in FIG. 6(b). If no change is needed, the display is presented according to the line number of the source program.

The presentation of program expression operation 13 is has a presentation of program expression step 38 and an expression modification evaluation step 37 for modifying this expression. In the expression modification evaluation step 37, an index derived from a definition of executing environment operation 12 is elevated and expression modification occurs. This operation 13 presents a program as an expression and can modify it at will. As it is capable of modifying the expression at will, it can modify expression and division into tasks according to the capability of each capacity when a parallel processing system is comprised of processors with different capacity.

Normally, processing then shifts to a determination of inter-processor architecture 40 after the program expression presentation operation is completed and a load diffusion determination step 39 determines the load that will be given to each processor and its task expression. In some cases, a determination of interprocessor architecture step 40 can be executed in parallel with the load diffusion determination step 39. The determination of inter-processor architecture step 40 determines which task to allot to which processor by taking into consideration communication volume among respective tasks and hardware-oriented positional relationship among the processors.

Referring again to FIG. 7, an example of expression modification in static load diffusion and the modification procedure therefore will now be described. As mentioned previously "+" stands for the operator corresponding to "parallel execution possible" and the symbol "." stands for the operation corresponding to "consecutive processing". The program can be considered to be divided into a partial program A and a partial program B, and it is assumed in this example, that partial program B must be executed after partial programs A. Also, the dependency relationship between partial programs A1, A2, B1 and B2 is such that execution of B1 must be after A1 and B2 must be after A2. The program configuration then corresponds to the situation shown in the upper half of FIG. 7(a).

The procedure for expression modification is the as shown in FIG. 7(b). First, an expression is derived corresponding to the partial programs at the highest resolution level (74). A check is made for each whether the number of terms that can be parallel processed in parallel at each level of breakdown of the partial program is larger than that of the number of processors (75). If it is not larger, the resolution level "i" of a partial program is reduced step by step, i.e. "i" is increased (72). If the number of terms becomes larger than the number of processors, the terms of the expression are considered to be grouped inside parentheses so that the number of such groups is equal to the number of processors. The load of each processor is evaluated (76). If the distribution of the load among the processors is not satisfactory, the placing of the parentheses is changed and the evaluation is performed again (77).

Load diffusion is halted if the load difference is within a permissible range designated by the user after repeating this processing for a predetermined number of times. If the local difference is outside the permissible range, the resolution level of the partial programs is reduced further and the evaluation of expression modification is performed. Alternatively, load diffusion can be repeated until the load difference has reached zero, i.e. there is equality of load among the processors. An example of load diffusion which is appropriate for the cases of one to four processors is shown in the lower column of FIG. 7 (1). The figures inside the parentheses for the terms of the expression indicate the load volume allotted to each processor. Thus, as shown by this example, load diffusion which is suitable for the number of processors and processing capability of the processor is performed by gradually lowering the resolution level of the partial program.

An example of the determination of which processor to be allotted to which partial program, and the associated procedure, will now be explained with reference to FIG. 8. Assume that a program is divided into seven partial programs according to an extraction of program configuration 11 (FIG. 1). In other words, there are seven tasks A to G and each of them is allotted to a processor. The processing for determining the processor to which the partial programs A to G are allotted will now be discussed. These partial programs A to G can be considered to be formed of lower rank partial programs. Here the marks (operators) for defining the communication volume among partial programs are: no mark representing a large communication volume;

representing a "*" medium communication volume and "+" representing small communication volume. The communication volume among respective partial programs is then defined by using these operators. The expression presentation of the entire program with emphasis on communication volume is, in this example, as shown in expression (a).

$$A*B+A*CD+A*E+A*FG+C*F+C*G+B*D \quad (a)$$

By placing this expression in parentheses, the positional relation among the processors, whose interprocessor structure is for a mesh-type coupled computer or hyper cube-type coupled computer is shown in partial program distributions can then be obtained depending on the locations of the parenthesis. For instance, the following distribution can be performed.

$$A*(B+CD+E+FG)+C*(F+G)+BD \quad (b)$$

$$A*(B+CD+FG)+C*(F+G)+A*E+BD \quad (c)$$

Then, the procedure for determining the positional relationship starts by finding a partial program X (partial program A in the foregoing example of FIG. 8(a)) which appears most in all the terms of expression (a) (81). Then, assume that the maximum number of connections from a processor to an adjacent processor (which is determined by the hardware configuration of the computer which is to execute the parallel program) is "n". "n" is 4 if the computer is mesh-type and "n" is 3 if it is three-dimensional hyper cube-type. A maximum of "n" terms including partial program X are placed inside the parentheses and partial program X is allotted to the processor that has a total of "n" connections (82). For the terms that are placed inside the parentheses, the corresponding partial programs alloted to the processor adjacent to partial program X if it is a term of one partial program [e.g. B and E of expression (b)] (83) and one of the corresponding partial programs as alloted if two or more partial programs are combined [e.g. CD and FG in expression (b)] (84). If terms containing partial program X still remain at this point, the partial programs of those terms are allotted near partial program X (85). Although the allotment of partial programs that communicate frequently with partial program X should be completed at this point, it is desirable to check the positional relationships and exchange positions so that partial programs that have a large communication of volume are placed near each other (86). Lastly, the terms that contain partial program X are eliminated from the expression. If there are partial programs that have not been allotted processing is repeated for those partial programs, with the same processing that were performed on partial program X (87).

Then referring to FIG. 3, and using the preparation of executing information operation 14, the expression that was ultimately determined in a presentation of program expression 38 is resolved into the number of processors that will be used in the execution. The partial programs are then allotted to the respective processors as tasks. The address of the program and data that will be loaded in each processor is determined and sent to an execution unit 15.

By presenting a source as an expression with partial programs as terms, there is no limit to the number of partial programs and combinations thereof because it becomes possible to place the defined expression inside parentheses at will and resolve terms from a partial program configuration, thereby enabling optimum load diffusion and allotment of the partial programs to respective processors.

Figure 9A:
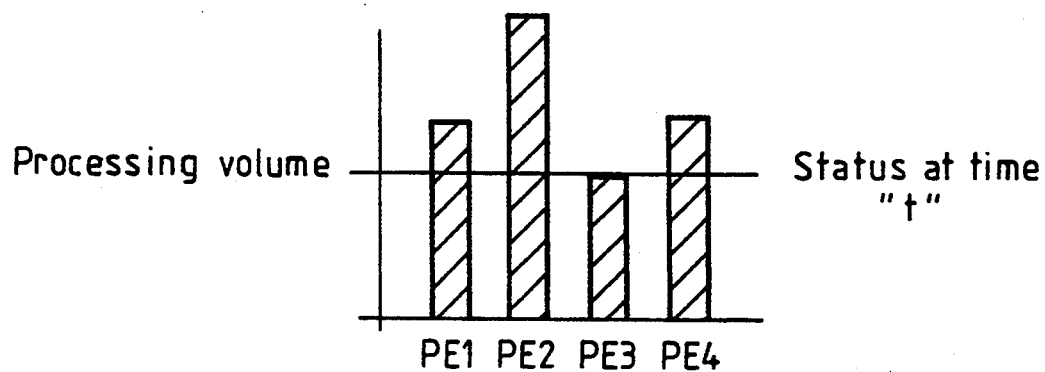
FIGS. 9(a) and 9(b) are diagrams for explaining an example of dynamic load diffusion processing procedure for dynamic load diffusion.
Figure 9B:
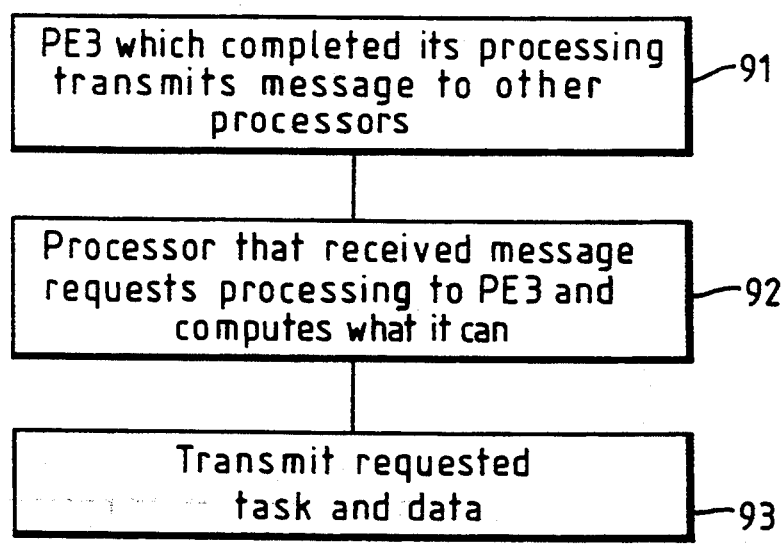

An example of dynamic load diffusion will now be discussed in greater detail. Assume that the processing status of each processor at time "t" is as shown in FIG. 9(a). The processing of processor PE3 is completed at this point. As shown in FIG. 9(b), processor PE sends a message that its processing has been completed to other processors (step 91). The other processors that receive this message compute the load volume that can be transferred to PE3 (step 92) and notify the program and data of transferrable processing to processor PE3 (step 93).

Now, assume that the following task expression has been given to processor PE2.

$$A(B1+B2)+C(D1+D2+D3+D4)$$

Wherein:

AB indicates that processing B is performed after processing A; and

Figure 5:
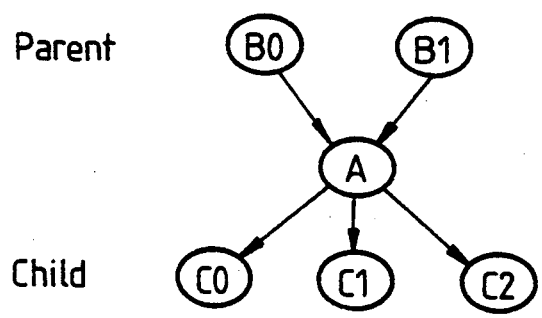
FIG. 5 is a diagram for explaining partial program configuration presentation.

A+B shows that processing A and processing B can be processed independently in parallel. The source program description and execution sequence of task expression are as shown in FIGS. 4 and 5.

Now, if processor PE2 was executing task CD1 when the message was received from processor PE3, processing of some of the remaining tasks CD2, CD3 and CD4 can be transferred to processor PE3. Thus, as shown in the flowchart in FIG. 9(c), processor PE2 will refer to the execution history and search for partial programs that are being executed (94). Then a the task expression will be checked to find unprocessed terms among the task expressions (95). Further reference is made to a task evaluation table 22 to obtain the loads of these tasks (96) and the task groups that will be consigned to processor PE3 are determined and notified to processor PE3 (97). The processor PE3, thus receives notice of the need to process transferred task groups from a plurality of processors, selects the task group that has the largest load volume and requests the originating processor to transmit the program and data. Thus, response, processor PE2 transmits the program and data (98).

Figure 10A:
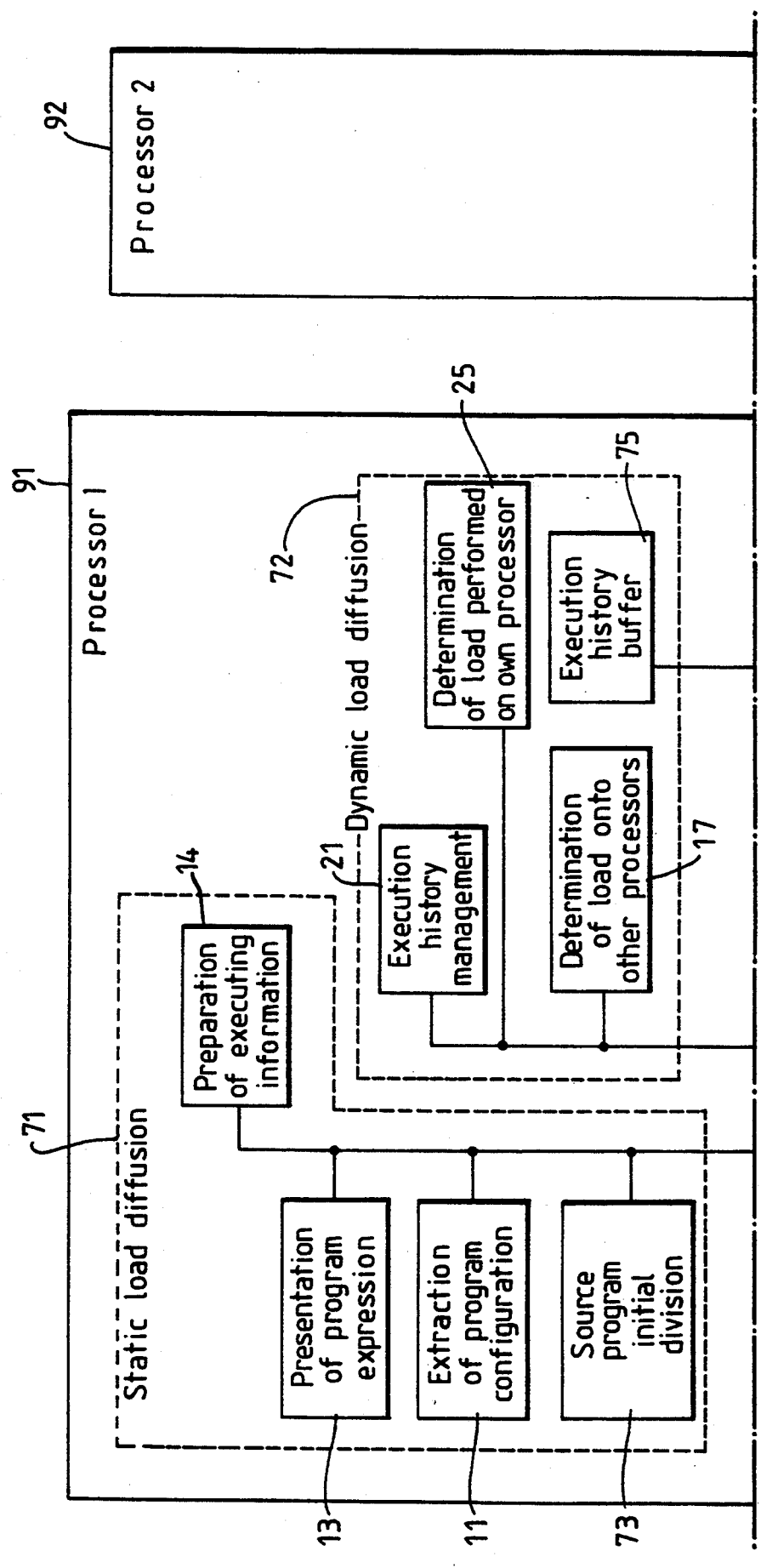
FIGS. 10a and 10b are combinable block diagrams showing an example of the processor configuration when the present invention is embodied within a processor.
Figure 10B:
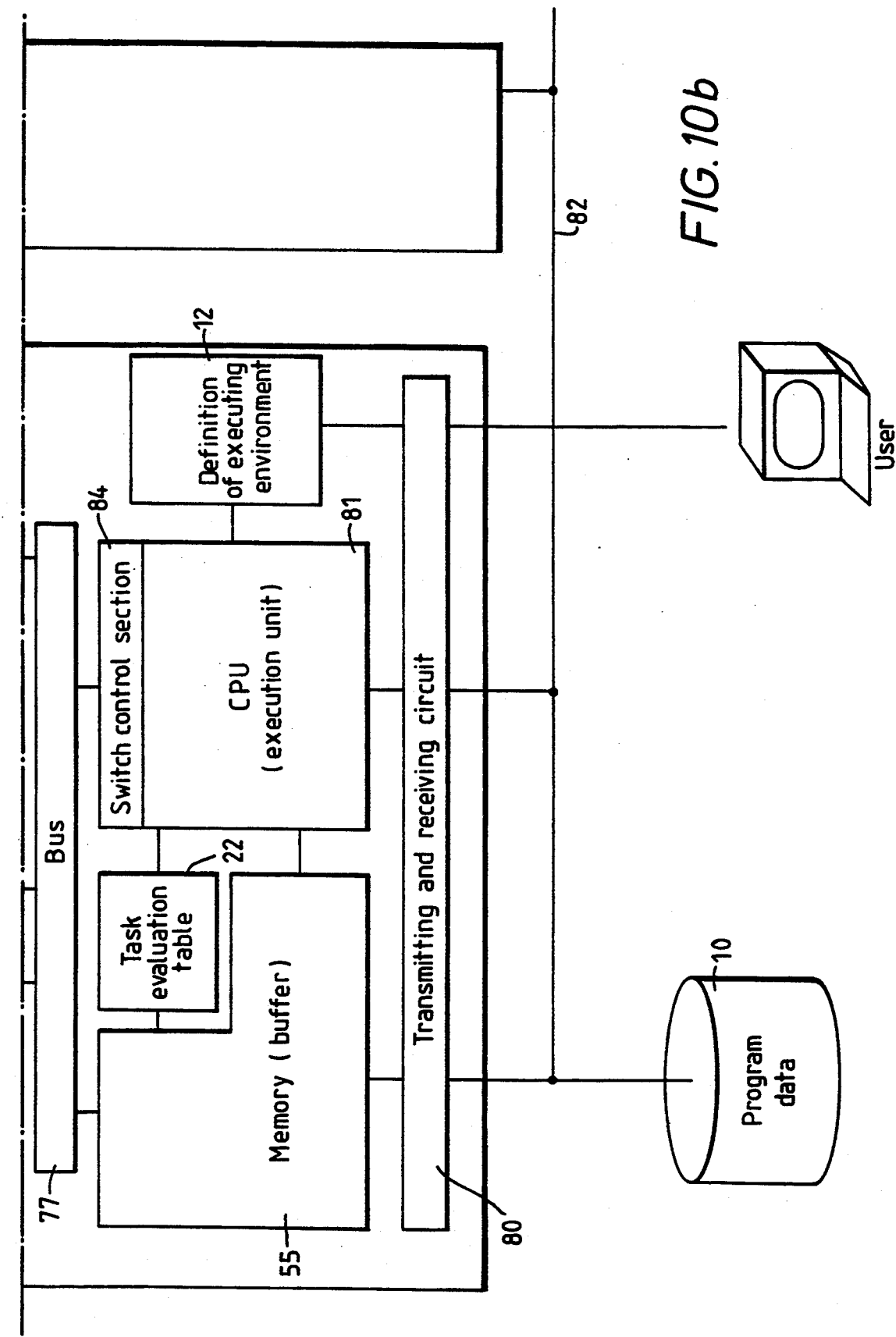

FIGS. 10a and 10b show the processor and system configuration when a means for carrying out the above functions is provided for each processor.

It should be noted that each of the components shown in FIGS. 10a and 10b represent a separate functional activity, rather than a separate physical element. Furthermore, some of these functions have been described previously and the same reference numerals are used for corresponding functions.

In the example of FIGS. 10a and 10b, all processors are assumed to have the same capability. Processors 91 and 92 are respectively connected to a file 10 of program data through bus Q82. Each processor has an execution unit (CPU) 81, a static load diffusion operation 71 and a dynamic load diffusion operation 72. These components are connected to one another through an internal bus 77. Each processor also has a memory (buffer) 55, a task evaluation table 22, a definition of executing environment operation 12 and a transmission and reception circuit 80, all connected to the CPU 81. The CPU 81 has a switching control section 84 for internal bus access. The static load diffusion operation 71 defines the extraction of program configuration operation 11 section, the presentation of program expression operation 13 section, the preparation of executing information operation 14 section and the source program initial division operation 73. The dynamic load diffusion operation 72 defines the execution history management operation 21, the load determination operation 25 corresponding to the processor having the load determination operation 17 for other processors and an execution history buffer 75.

First, the operations when performing a static load diffusion will be explained.

The source program is analyzed in order to perform static load diffusion. When a request for source analysis is made by a user, the source program is first read into memory 55 via the transmission and reception circuit 80 upon request from the CPU 81. Then the CPU 81 reads a source program initial division 73 program from the static load diffusion operation 71 (which is a program group stored in a ROM). This source program initial division operation 73 performs a simple division of the source program into subprograms that match the number of processors that are not currently being used according to the subroutine unit and number of statements. The purpose of this is to allow the maximum number of processors to perform source program analysis, to permit high-speed processing. The divided subprograms are transmitted to other processors using the bus 82. The CPU81 of the processor that receives a subprogram will read in the extraction of program configuration operation 11 and the presentation of program expression operation 13 after reading the definition of executing environment operation 12 and inputting analysis parameters. Each of these processors performs a source program analysis, and transmits the program configuration and presentation of program expression that are the results of this analysis to one processor (e.g. processor 1) via the bus 82. Then the CPU 81 of that one processor 1 reads the program for the preparation of executing information operation 14, prepares a corresponding overall configuration of the source program and prepares a task evaluation table 22. Then load diffusion can be performed according to expression presentation and expression modification.

When there is no request for execution of a source program, static load diffusion is completed by storing this result of static load diffusion into an external memory as the result of source program analysis. Even when the executing environment changes at the time when this source program is executed (e.g. increasing the number of processors has increased), all that needs to be done is to re-execute the operation from the presentation of program expression operation 13 (FIG. 1) onward because the results of source program analysis are stored.

When there is a request for execution of the source program, the partial program which will become the load, the address of the corresponding data and the task evaluation table 22 are transmitted to other processors through the bus 82. Parallel processing is then executed.

The operations carried out during dynamic load diffusion will now be explained.

First, the processor that has completed its processing broadcasts a notice of completion of processing to all the other processors. At the same time, any processor in which processing is continuing reads a section (program) to the load determination operation 25 for that processor from the dynamic load diffusion operation 72 (which is also a program group stored in a ROM). When the notice of completion of processing, is received, any other processor (which is continuing its processing) cuts into the current execution and reads a section (program) for the load determination operation 17 for other processors. This readout is performed only during the first cut-in and is subsequently stored inside the processor. A section (program) for the load determination operation 25 for the processor carrying out that section refers to an execution history buffer 75 to determine the partial program currently being executed. A section for determining the of load on other processors 76 determines the task groups that are processed after the partial program currently being executed, from the task expression and computes the load corresponding to these tasks by referring to the task evaluation table 22. A the processor which is continuing to process a partial program determines the task groups which correspond to approximately half of the computed load and notifies this to the processor that has completed its processing. Thus, processing of more than one task can be requested by the processor that has completed its processing at a given time. After receiving the load volume, the processor that has completed its processing computes the maximum load it will receive, being the section for load determination operation 25, and outputs a request for transmission of a partial program and data to the processor that signalled that it had maximum load. When such a partial program is transferred, the processor also receives relevant information from the task evaluation table. This will prepare an environment for execution the of new load at the processor that has completed its processing.

Figure 11:
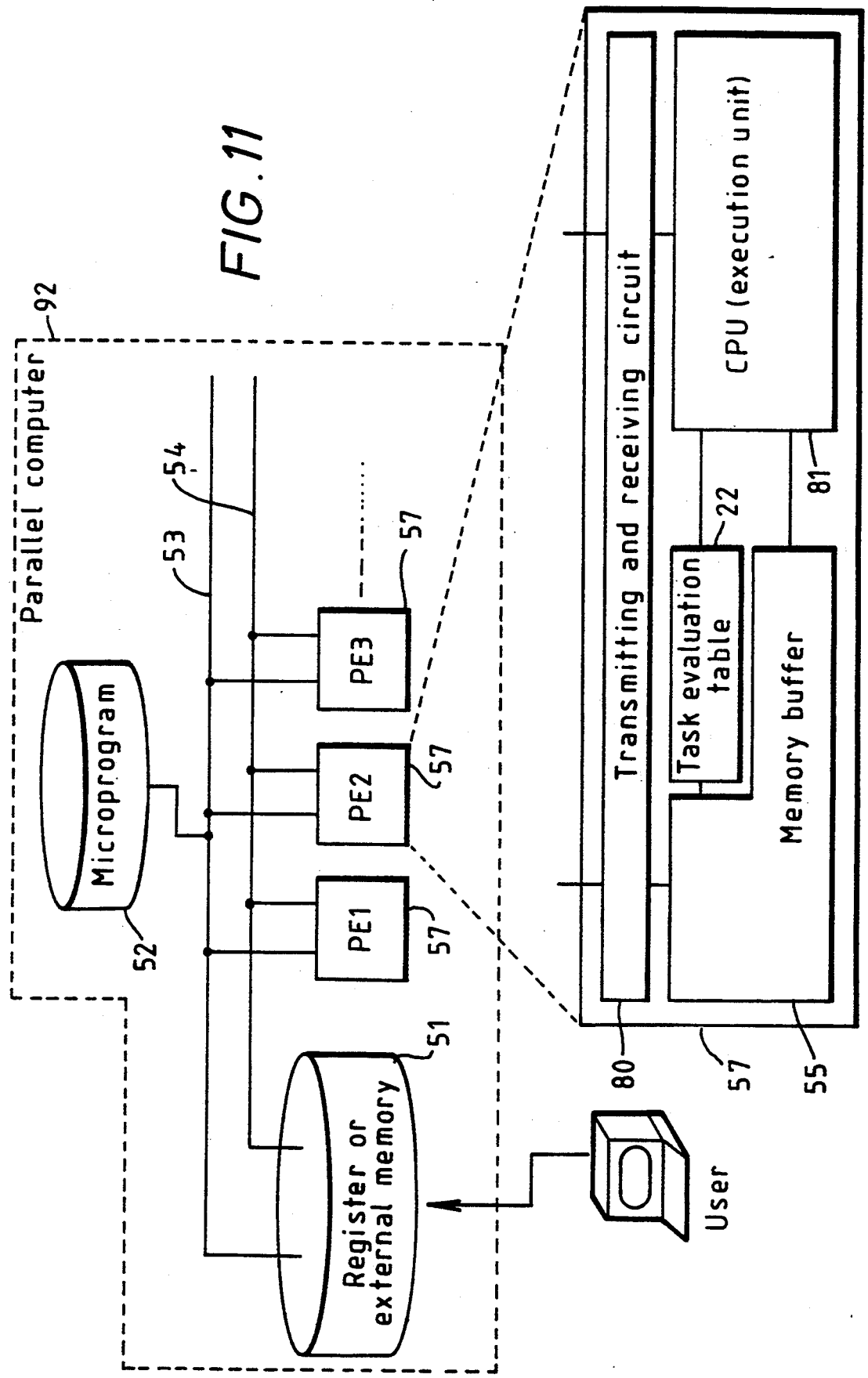
FIG. 11 is a block diagram showing an example of the configuration of a parallel computer with an external microprogram embodying the present invention.

FIG. 11 is an example of a system configuration in which the hardware volume has been reduced by configuring the system of the present invention so that it is controlled by an independent microprogram 52. In addition, all components with the exception of the user interface form parts of a parallel computer 92. Although processors can have a different capacity in such a case, the simplest configuration capability assumes that all processors 57 have the same capability, so that the program stored in ROM, the internal bus 77 and the switching control section of internal bus access 84 can be omitted from the configuration in FIGS. 10a and 10b. The register or an external memory unit 51 stores the source program and data input by the user.

The operations carried out when performing a static load diffusion in such a system will now be explained.

The source program needs to be analyzed in order to perform static load diffusion. When a user requests source analysis, one of the plurality of processors 51 which is not currently being used, e.g. processor PE1, obtains the right to access the register or external memory 51. Then PE1 will read out a source program initial division program from the microprogram 52. This source program initial division program performs simple division of a source program into subprograms that match the number of processors 57, including processor PE1 according to the subroutine unit and number of statements. Subprograms are transmitted to unused processors through buses 53 and 54. Any processor which receives a subprogram puts out a request to transmit the source analysis program that corresponds to the extraction of program configuration operation 11 and a presentation of program expression operation 13 shown in FIGS. 10a and 10b and the source analysis program is transmitted in a single step to respective processors through the bus 53. Each processor performs source analysis and transmits the program configuration and the presentation of program expression to processor PE1 through buses 53 and 54. Processor PE1 accesses the microprogram 52 and reads out the program that corresponds to the preparation of executing information operation 14 in FIGS. 10a and 10b, thereby preparing the entire configuration of the source program and obtaining load diffusion and a task evaluation table 22 through expression presentation and expression modification. Such an arrangement is also applicable when there are processors with different capability.

When there is a request for source program execution, the partial program that will become the load, the address of the corresponding data in a register or external memory 51 and a task evaluation table 22 are transmitted to a group of processors through buses 53 and 54. The program that has been read from the microprogram is erased from each processor just before the execution of parallel processing. Two sets of buses are made available to reduce the number of conflicts between microprogram readout and source program forwarding which results in waiting for an open bus.

Functions which occur during dynamic load diffusion will now be discussed. A processor which has completed its processing (PE3, for instance) broadcasts the completion of processing to all processors via a bus 54. At the same time, processor PE3 reads a program for the load determination operation 17 through the bus 53. A processor (PE4, for instance) which receives the notice of completion of processing, cuts into the current execution and reads out a program for load determination operation 17 for other processors shown in FIGS. 10a and 10b from a microprogram. This readout is performed only during the first cut-in and is subsequently stored inside the processor. The program for the load determination operation 17 for other processors refers to an execution history determines the currently being executed partial program. Then it determines the task groups that are processed after the currently being executed partial program from the task expression and computes the load corresponding to these tasks by referring to the task evaluation table 22. Processor PE4 also determines the task groups which correspond to approximately half of the computed load of the processors with the same capability and the task groups with load according to the capabilities of processors with different capability transmit to processor PE3.

After receiving the load volume, processor PE3 computes the maximum load a program for determination of executed load and outputs a request for transmission of a partial program and data to processor PE4, which is the processor that signalled that it had maximum load. When such a partial program is transferred the processor also receives the relevant information from the task evaluation table 22. This will prepare an environment for execution of a new load by processor PE3.

Figure 12:
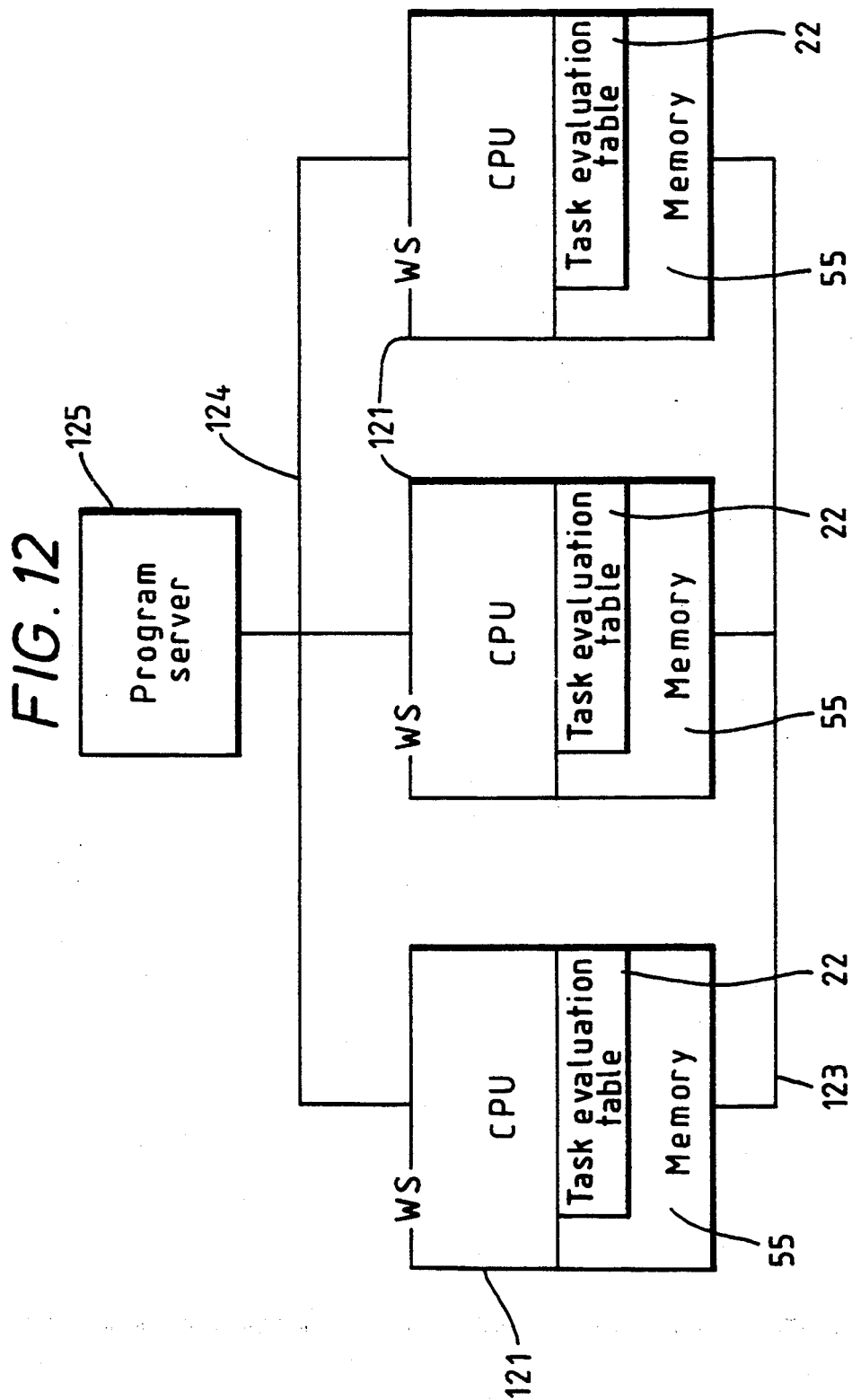
FIG. 12 is a block diagram showing an example of a parallel processing system according to the present invention that uses workstations.

FIG. 12 is an example in which the present invention is carried out by a plurality of independent workstations (WS) 121 with networks 123 and 124. In FIG. 12, it is assumed that the area for storing the source program which is in a register or an external memory 51 in FIG. 11 is inside each workstation 121. In addition, the microprogram in FIG. 11 is provided by a separable program server 125. Alternatively, the program server can be one of the workstations 121.

The operations carried out during parallel processing are the same as that in the case of FIG. 11 except that there is no source program readout. Since each workstation 121 is connected by networks 123,124 in FIG. 12, transmission and reception wiring can be connected from one workstation to a considerable number of other workstations, thereby permitting optimum inter-processor architecture.

Since new loads can be allotted successively to processors that have completed their processing by using this method, the total load can be diffused according to any data that is used for executing the program. Moreover, no computation resource is required for system monitoring or hardware for monitoring because there is no need to monitor the system at all times.

According to the present invention, the number of partial programs that are obtained by dividing the program to be executed is not limited because the program to be executed can be presented in the form of an expression that has partial programs or combinations of partial programs as its terms and the present invention makes it possible to modify such expressions and resolve terms at will, enabling static load diffusion even if the parallel computer system has processors with a different capability. Also, the decision of which partial program is to be allot to which processor can be made from evaluation and modification of the expression. If the resolution level of the program is raised to the level of individual resistors, the present invention can also be used as a parallel compiler. In addition, there is no increase in hardware volume despite the increase in the number of processors because static load diffusion and allotment of partial programs to each processor is performed on a software basis.

Since dynamic load diffusion has a task expression that was obtained during static load diffusion and an evaluation table of terms that are included in that expression, the load corresponding to the processing that is being executed and on the remaining processing can be determined immediately. This gives a small overhead in load volume computation. In addition, a system embodying the present invention does not require any computation resources for system monitoring or hardware for monitoring because there is no need to monitor the system at all times.

What is claimed is:

1. A method of processing a program by parallel processing using a plurality of processors, said method comprising the steps of:
   dividing said program into a plurality of sets of instructions, each set of instructions representing a plurality of partial programs;
   determining a plurality of relationships for said plurality of partial programs, each relationship of said plurality of relationships corresponding to a relationship between a corresponding two or more partial programs of said plurality of partial programs;
   determining a plurality of expressions, each expression of said plurality of expressions corresponding to a respective set of said plurality of sets;
   investigating said plurality of expressions to select an expression of said plurality of expressions having a predetermined characteristic; and
   assigning said plurality of partial programs to said plurality of processors, for parallel processing thereby, on a basis of a selected set of said plurality of sets corresponding to a selected expression of said plurality of expressions.

2. A method according to claim 1, including the further step of: displaying said plurality of partial programs corresponding to said selected set of said plurality of sets.

3. A method according to claim 1, including the further step of: displaying said plurality of relationships corresponding to said plurality of partial programs corresponding to said selected set of said plurality of sets.

4. A method according to claim 1, including the further step of: allowing at least some of said plurality of expressions to be modified by a user prior to said investigating of said plurality of expressions.

5. A method according to claim 1, wherein said step of assigning of said plurality of partial programs includes a sub-step of determining a processing capability for each of said plurality of processors.

6. A method according to claim 1, wherein said step of determining of said plurality of relationships includes a sub-step of determining an estimated processing time for each partial program of said plurality of partial programs for each set of said plurality of sets, and said step of investigating of said plurality of expressions includes a sub-step of comparing said estimated processing times.

7. A method according to claim 1, wherein said step of investigating of said plurality of expressions is performed sequentially with respect to said plurality of expressions, and said investigating of said plurality of expressions is halted when said expression of said plurality of expressions is selected.

8. A method according to claim 1, wherein said predetermined characteristic is an optimum processing time for parallel processing of said plurality of partial programs of said selected set of said plurality of sets by said plurality of processors.

9. A method of processing a program by parallel processing using a plurality of processors, said method comprising the steps of:
   dividing said program into a plurality of partial programs;
   determining a plurality of relationships for said partial programs, each relationship of said plurality of relationships corresponding to a relationship between a corresponding two or more partial programs of said plurality of partial programs;
   determining a plurality of expressions, each expression of said plurality of expressions corresponding to a respective combination of said plurality of relationships;
   investigating said plurality of expressions to select an expression of said plurality of expressions having a predetermined characteristic; and
   assigning said plurality of partial programs to said plurality of processors, for parallel processing thereby, on a basis of a combination of said plurality of relationships corresponding to a selected expression of said plurality of expressions.

10. A method of processing a program by parallel processing using a plurality of processors, said method comprising the steps of:
    dividing said program into a plurality of partial programs;
    determining a plurality of relationships for said plurality of partial programs, each relationship of said plurality of relationships corresponding to a relationship between a corresponding two or more partial programs of said plurality of partial programs;
    determining an expression corresponding to a combination of said plurality of relationships;
    investigating said expression to determine whether said expression has a predetermined characteristic;
    re-dividing said program into a plurality of further partial programs unless said expression has said predetermined characteristic;
    repeating steps of said determining of a plurality of relationships, said determining of an expression, and said investigating of said expression, for said plurality of further partial programs; and
    assigning one of said plurality of partial programs and said plurality of further partial programs to said plurality of processors, for parallel processing thereby, on a basis of said expression when said expression has said predetermined characteristic.

11. A method according to claim 10, wherein said plurality of further partial programs correspond to subdivisions of said plurality of partial programs.

12. A method of processing a program by parallel processing using a plurality of processors, said method comprising the steps of:
    dividing said program into a plurality of partial programs;
    determining a plurality of relationships for said plurality of partial programs, each relationship of said plurality of relationships corresponding to a relationship between a corresponding two or more partial programs of said plurality of partial programs;

determining an expression corresponding to a combination of said plurality of relationships;

investigating said expression corresponding to a combination of said plurality of relationships;

investigating said expression to determine whether said expression has a predetermined characteristic;

determining a further plurality of relationships for said plurality of partial programs unless said expression has said predetermined characteristic, said plurality of further relationships corresponding to a further relationship between said corresponding two or more partial programs of said plurality of partial programs;

repeating steps of said determining of an expression, and said investigating of said expression, for said further plurality of relationships; and assigning said plurality of programs to said plurality of processors, for parallel processing thereby, on a basis of said expression when said expression has said predetermined characteristic.

13. A method of processing a plurality of programs by parallel processing using a plurality of processors, said method comprising the steps of:

dividing said program into a plurality of partial programs;

assigning said plurality of partial programs to said plurality of processors for parallel processing thereby;

generating a completion signal when any processor of said plurality of processors has completed parallel processing of partial programs of said plurality of partial programs assigned thereto, said completion signal being generated by said any processor of said plurality of processors;

detecting said completion signal at all other processors of said plurality of processors; and transferring at least one partial program of said plurality of partial programs from at least one processor of said all other processors of said plurality of processors to another processor of said plurality of processors.

14. A processing unit for processing a program by parallel processing comprising:

a plurality of processors;

a dividing means for dividing said program into a plurality of sets of instructions, each set of instructions representing a plurality of partial programs;

a relationship determining means for determining a plurality of relationships for said plurality of partial programs, each relationship of said plurality of relationships corresponding to a relationship between a corresponding two or more partial programs of said plurality of partial programs;

an expression determining means for determining a plurality of expressions, each expression of said plurality of expressions corresponding to a respective set of instructions of said plurality of sets of instructions;

an investigating means for investigating said plurality of expressions to select one expression of said plurality of expressions having a predetermined characteristic; and an assigning means for assigning said plurality of partial programs to said plurality of processors, for parallel processing thereby, on a basis of a selected set of said plurality of sets of instructions corresponding to a selected expression of said plurality of expressions.

15. A processing unit for processing a program by parallel processing, comprising:

a plurality of processors;

a dividing means for dividing said program into a plurality of partial programs;

a relationship determining means for determining a plurality of relationships for said partial programs, each relationship of said plurality of relationships corresponding to a relationship between a corresponding two or more partial programs of said plurality of partial programs;

an expression determining means for determining a plurality of expressions, each expression of said expressions corresponding to a respective combination of two or more relationships of said plurality of relationships;

an investigating means for investigating said plurality of expressions to select an expression of said plurality of expressions having a predetermined characteristic; and an assigning means for assigning said plurality of partial programs to said plurality of processors, for parallel processing thereby, on a basis of a combination of said plurality of relationships corresponding to a selected said expression of said plurality of expressions.

16. A processing unit for processing a program by parallel processing comprising:

a plurality of processors;

a dividing means for dividing said program into a plurality of partial programs;

a relationship determining means for determining a plurality of relationships for said plurality of partial programs, each relationship of said plurality of relationships corresponding to a relationship between a corresponding two or more partial programs of said plurality of partial programs;

an expression determining means for determining an expression corresponding to a combination of two or more relationships of said plurality of relationships;

an investigating means for investigating said expression to determine whether said expression has a predetermined characteristic;

wherein said dividing means for dividing said program is arranged to re-divide said program into a plurality of further partial programs unless said expression has said predetermined characteristic, said relationship determining means for determining a plurality of relationships is arranged to repeat said determining of a plurality of relationships, said expression determining means for determining an expression is arranged to repeat said determining of an expression, and said investigating means for investigating said expression is arranged to repeat said investigating of said expression, for said plurality of further partial programs; and wherein said processing unit further includes an assigning means for assigning one of said plurality of partial programs and said plurality of further partial programs to said plurality of processors, for parallel processing thereby, on a basis of said expression when said expression has said predetermined characteristic.

17. A processing unit for processing a program by parallel processing comprising:

a plurality of processors:
a dividing means for dividing said program into a plurality of partial programs;
a relationship determining means for determining a plurality of relationships for said plurality of partial programs, each relationship of said plurality of relationships corresponding to a relationship between a corresponding two or more partial programs of said plurality of partial programs;
an expression determining means for determining an expression corresponding to a combination of said plurality of relationships;
an investigating means for investigating said expression to determine whether said expression has a predetermined characteristic;
wherein said relationship determining means for determining a plurality of relationships is arranged to determine a further plurality of relationships for said plurality of partial programs unless said expression has said predetermined characteristic, said plurality of further relationships corresponding to a further relationship between said corresponding two or more partial programs of said plurality of partial programs, said expression determining means for determining an expression is arranged to repeat said determining an expression, and said investigating means for investigating said expression is arranged to repeat said investigating of said expression, for said further plurality of relationships; and wherein said processing unit further includes an assigning means for assigning said plurality of programs to said plurality of processors, for parallel processing thereby, on a basis of said expression when said expression has said predetermined characteristic.

18. A processing unit for processing a plurality of programs by parallel processing comprising:
a plurality of processors;
a dividing means for dividing said program into a plurality of partial programs;
an assigning means for assigning said plurality of partial programs to said plurality of processors for parallel processing thereby; wherein
a completion signal generator for allowing any processor of said plurality of processors to generate a completion signal when said any processor of said plurality of processors has completed parallel processing of said plurality of partial programs assigned thereto;
a detector for allowing remaining processors of said plurality of processors other than said any processor of said plurality of processors to detect said completion signal; and
a transfer for allowing at least one processor of said remaining processors of said plurality of processors other than said any processor of said plurality of processors to transfer at least one of said plurality of partial programs therefrom to said any processor of said plurality of processors.

* * * * *